United States Patent
Waterman et al.

(10) Patent No.: US 9,360,036 B2
(45) Date of Patent: Jun. 7, 2016

(54) FASTENER ASSEMBLY

(71) Applicant: Stanley Fastening Systems, L.P., North Kingstown, RI (US)

(72) Inventors: Richard B. Waterman, North Kingstown, RI (US); Brian C. Burke, Barrington, RI (US); Lok C. Lam, Warwick, RI (US)

(73) Assignee: Stanley Fastening Systems, L.P., North Kingstown, RI (US)

( * ) Notice: Subject to any disclaimer, the term of this patent is extended or adjusted under 35 U.S.C. 154(b) by 0 days.

(21) Appl. No.: 14/228,772

(22) Filed: Mar. 28, 2014

(65) Prior Publication Data

US 2014/0294535 A1    Oct. 2, 2014

Related U.S. Application Data

(60) Provisional application No. 61/806,509, filed on Mar. 29, 2013.

(51) Int. Cl.
*F16B 15/02* (2006.01)
*F16B 15/08* (2006.01)

(52) U.S. Cl.
CPC ..................... *F16B 15/08* (2013.01)

(58) Field of Classification Search
CPC .................. F16B 15/08; F16B 27/00
USPC .................. 411/442, 444; 52/586.1
See application file for complete search history.

(56) References Cited

U.S. PATENT DOCUMENTS

| | | | |
|---|---|---|---|
| 1,714,738 A | 5/1929 | Smith | |
| 2,201,129 A | 5/1940 | Weiland | |
| 3,212,632 A * | 10/1965 | Baum et al. | 206/346 |
| 4,930,630 A * | 6/1990 | Habermehl | F16B 43/00 |
| | | | 206/347 |
| 5,069,340 A * | 12/1991 | Ernst et al. | 206/347 |
| 5,542,323 A * | 8/1996 | Habermehl et al. | 81/434 |
| 5,660,016 A | 8/1997 | Erwin et al. | |
| 5,946,874 A * | 9/1999 | Roberts | 52/464 |
| 5,953,878 A | 9/1999 | Johnson | |
| D427,050 S | 6/2000 | Bryan | |
| 6,250,464 B1 * | 6/2001 | Daubinger et al. | 206/343 |
| 6,314,699 B1 | 11/2001 | West | |
| 6,402,415 B1 | 6/2002 | Eberle, III | |
| 6,470,641 B1 | 10/2002 | Faure | |
| D470,039 S | 2/2003 | Pelc | |
| 6,651,398 B2 | 11/2003 | Gregori | |
| D485,160 S | 1/2004 | Pelc | |
| 6,711,864 B2 | 3/2004 | Erwin | |
| 6,779,959 B1 * | 8/2004 | Yang | 411/443 |
| 6,810,633 B2 | 11/2004 | Harris, Sr. | |
| 6,851,884 B2 | 2/2005 | Eberle | |
| 6,871,467 B2 | 3/2005 | Hafner | |
| 7,052,200 B2 | 5/2006 | Harris | |
| 7,098,812 B2 | 8/2006 | Hirota | |
| D547,169 S | 7/2007 | Harris | |
| 7,409,803 B2 | 8/2008 | Grohman | |
| 7,546,717 B2 | 6/2009 | Juan Puerta | |
| 7,578,105 B2 | 8/2009 | Eberle, III | |
| D600,105 S | 9/2009 | Harris | |

(Continued)

*Primary Examiner* — Gary Estremsky
(74) *Attorney, Agent, or Firm* — Rhonda L. Barton

(57) ABSTRACT

A fastener assembly of fastening members formed from connected and collated fasteners mounted in non-contacting clips, for feeding into a fastening tool. The fastening members are driven by a powered fastening tool into deck boards and joists for building a deck or driven into alternate workpieces for building other structures.

15 Claims, 2 Drawing Sheets

(56) References Cited

U.S. PATENT DOCUMENTS

| | | |
|---|---|---|
| 7,600,353 B2 | 10/2009 | Hafner |
| D604,599 S | 11/2009 | Prichard, Jr. et al. |
| D610,440 S | 2/2010 | Prichard, Jr. et al. |
| 7,874,113 B2 | 1/2011 | Eberle, III |
| 7,908,812 B2 | 3/2011 | Eberle, III |
| 7,984,599 B2 | 7/2011 | Snell et al. |
| 8,161,702 B2 | 4/2012 | Eberle, III |
| D664,836 S | 8/2012 | Kikuchi |
| 8,256,614 B1 | 9/2012 | Wadsworth, Sr. |
| 8,287,206 B2 | 10/2012 | Eberle, III |
| 2002/0059766 A1 | 5/2002 | Gregori |
| 2004/0079041 A1 | 4/2004 | Bergeron et al. |
| 2004/0182728 A1* | 9/2004 | Almeras et al. ............... 206/338 |
| 2006/0059822 A1 | 3/2006 | Guffey |
| 2006/0283122 A1 | 12/2006 | Burgess et al. |
| 2008/0029414 A1* | 2/2008 | Uejima et al. ................ 206/345 |
| 2011/0192112 A1 | 8/2011 | Pelc, Jr. |
| 2013/0001116 A1* | 1/2013 | Lin et al. ...................... 206/347 |

\* cited by examiner

FASTENER ASSEMBLY

BACKGROUND OF THE INVENTION

1. Field of the Invention

The present invention relates, in general, to the field of fasteners. In particular, the present invention relates to a fastener assembly including a plurality of clips and fasteners. The clips and fasteners can be used in construction applications such as deck board installation.

2. Description of the Related Art

The use of fastening tools, such as pneumatic or electrically powered fastening tools, is commonplace in the construction industry. Devices, such as nails employed with fastening tools are often provided in collated assemblies. However, in the field of deck construction, current deck board installation requires the user to manually and separately connect a clip and fastener, position the clip and fastener together in the correct location on the deck boards for installation, and align a drill or hammer with the clip and fastener to install the clip and fastener. The aforementioned steps are repeated hundreds or thousands of times for each deck installation.

Existing fasteners, such as those disclosed in U.S. Pat. No. 8,256,614, include multiple clips that are individually joined to each other, or interconnected after release from a fastening tool. However, U.S. Pat. No. 8,256,614 has the disadvantage of requiring two modes of installation for feeding the fastening components: an apparatus of installation tool for feeding deck clips, and an apparatus of installation tool for allowing a screw/nail of each deck clip to be positioned in an associated deck clip. Accordingly, there is a need in the art for an improved fastener assembly, such as the fastener assembly disclosed herein, that reduces the number of steps for fastening tool loading, thereby saving deck construction time.

SUMMARY OF THE INVENTION

To facilitate the use of nails by pneumatic or electrically powered fastening tools, in deck construction, nails can be serially collated using, for example, adhesively applied tape or other known collating media to form strips that can be easily inserted into and used by such fastening tools.

The present invention allows the user to load a plurality of serially arranged clips with connected nails or fasteners into a fastening tool and drive the clip and fastener simultaneously from the tool into the deck boards. Subsequent fasteners in the fastener assembly are fed to the nosepiece of the fastening tool for the next clip and fastener installation.

Combining the clip and fastener to form a single fastening member in a fastener assembly reduces the number of steps required to construct a deck or other structure. As a result, the time required for feeding clips and fasteners into a fastening tool and thereby constructing a deck can be significantly reduced. Accordingly, the fastener assembly of the present invention provides time saving construction of deck boards or other structures.

BRIEF DESCRIPTION OF THE DRAWINGS

The numerous advantages of the present invention may be better understood by those skilled in the art by reference to the accompanying Figures. In the drawings, like reference numerals designate corresponding parts throughout the several views.

DETAILED DESCRIPTION OF THE INVENTION

The inventive fastener assembly disclosed herein can be used under a broad variety of conditions and for numerous applications. The inventive fastener assembly can be used as feed to a variety of nailers and/or other fastening tools. In operation, the fastener assembly disclosed herein, can be stored in the housing and magazine of a fastening tool (not shown).

Individual fastening members form the fastener assembly. The fastening members are sequentially fed forward into a nosepiece of the fastening tool by a pusher in the magazine. Under pneumatic, electrical or other source of power, a fastening tool driver blade translates to impact the forwardmost fastening member of the fastener assembly that resides in the nosepiece so that the fastening member may be driven into a joist or workpiece (not shown).

Reference will now be made in detail to the presently preferred embodiments of the invention, examples of which are illustrated in the accompanying drawings.

Figure 1:
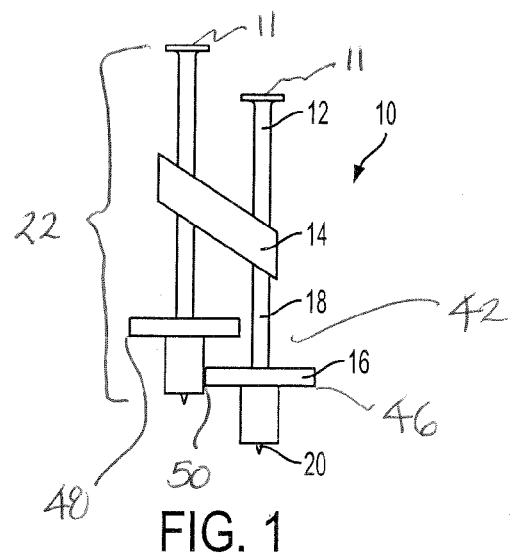
FIG. 1 illustrates a section of a fastener assembly according to an embodiment of the invention.
Figure 2:
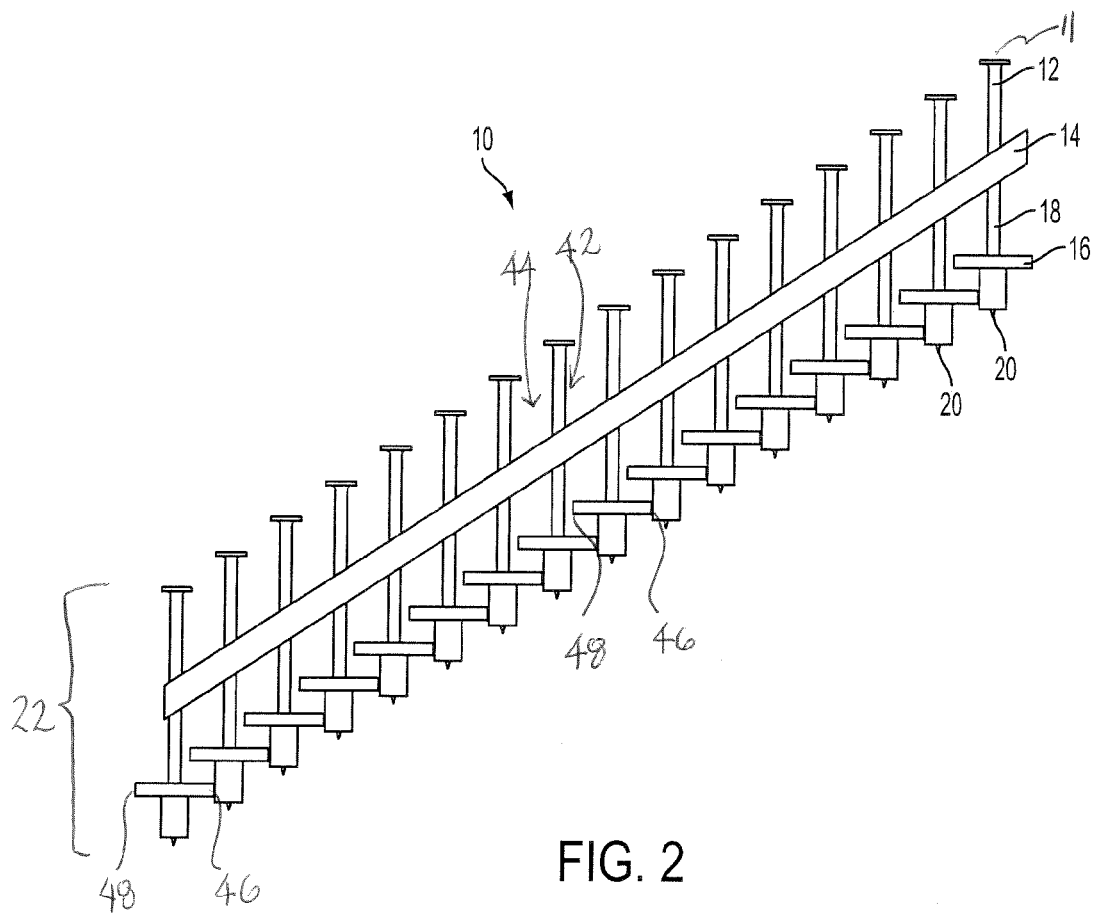
FIG. 2 illustrates an expanded section of a fastener assembly according to the embodiment of FIG. 1.

In accordance with an embodiment of the invention, FIGS. 1 and 2 illustrate a fastener assembly for use in securing adjacent deck boards to an underlying joist. In the Figures, the fastener assembly 10 includes a plurality of fastening members 22. The individual fastening members 22 include a first component, such as a fastener 12, in the form of a nail, having an elongated body, a head portion 11 at one end of the elongated body, a tip portion 20 at an opposite end, and a shank portion 18 therebetween, Individual fastening members 22 are connected by the fasteners 12 being collated. The fastener assembly 10 is formed by bonding the individual fasteners 12 with the collation member 14 at each shank 18, and inserting the fastener 12 into a second component mounted to the lower portion of the fastener 12 above the tip portion 20.

The second component can be a clip 16 that effectively maintains the spacing between the adjacent deck boards on the joist. Manufacturing the fastening member 22 of the fastener assembly 10 includes the nails 12 being connected to each other by the collation member 14, and inserted into the clip 16. As shown in FIGS. 1 and 2, the fastener 12 is also located substantially in the center of the clip 16. The clip 16 is separately attached to the fastener shank 18 above the tip portion 20 of each fastener 12 in the fastening member. The clip 16 is attached in the fastener assembly 10 by contact with only the fastener 12. Each clip 16 is physically separate from adjacent clips in the fastener assembly 10.

Figure 3:
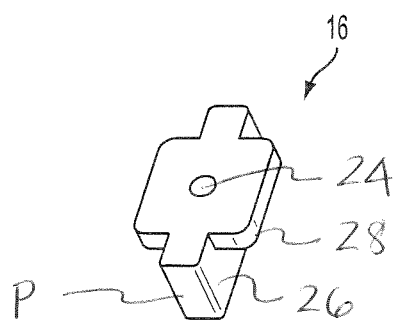
FIG. 3 illustrates a perspective view of fastener assembly clip according to the embodiment of FIG. 1.
Figure 4:
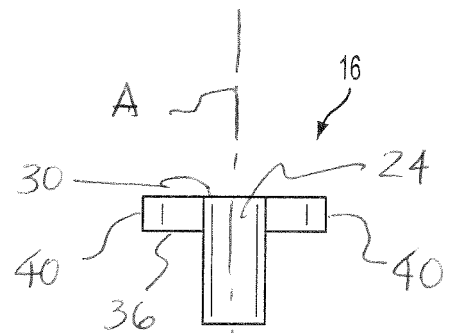
FIG. 4 illustrates a cross sectional view of the fastener assembly clip according to the embodiment of FIG. 1.

FIG. 3 illustrates a perspective view of the clip 16 and FIG. 4 illustrates a cross-sectional view of the clip. The clip 16 has an aperture 24 that defines a longitudinal axis A, as shown in FIG. 4, for receiving the fastener 12. The longitudinal axis of the fastener 12 is coaxial with the longitudinal axis A of the clip.

In an embodiment, the shank portion 18 of the fastener 12 is substantially the same diameter as the aperture 24 in the clip 16. As such, the fastener 12 is inserted into the clip 16 in an interference fit. Therefore, no further elements are required to hold the fastener 12 in position in the clip 16 before the fastening member 22 is driven into the joist or workpiece.

The diameter of the head portion 11 of the fastener 12 is larger than the diameter of the aperture 24 in the clip 16. The larger head portion 11 prevents the fastener head from passing through the clip 16 or being recessed below an upper surface of the clip when the fastening member 22 is struck by the driver blade of the fastening tool. When driven into the joist, the larger head portion 11 of the fastener 12 allows the fastener to securely hold the clip 16 to the joist.

The clip 16 of the fastening member 22 can be a unitary member formed of a base portion 26 and a crosspiece 28 extending perpendicularly across an upper surface of the base portion. See for example, FIG. 3. In an embodiment, the clip 16 has a substantially T-shaped cross section as shown in FIG. 4. The aperture 24 in the clip extends from an upper surface 30 of the clip 16 through the clip body and can have a uniform diameter throughout its length. The aperture can pass through substantially the center of the base portion 26 and the crosspiece 28.

Figure 5:
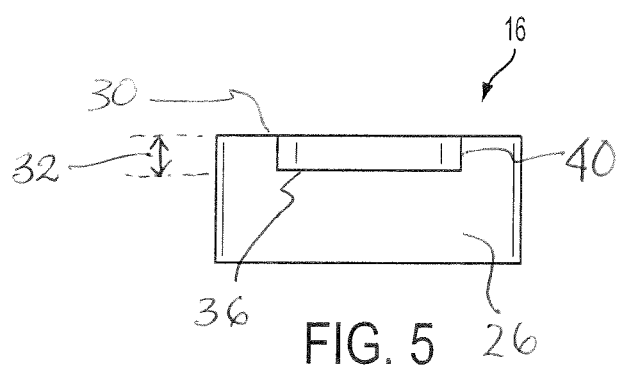
FIG. 5 illustrates a side view of the fastener assembly clip according to the embodiment of FIG. 1.

As shown in FIG. 5, for example, the base portion 26 of the clip 16 is contiguous around the perimeter, and rectangular in cross section. The contiguity of the base portion 26 keeps dust and debris from entering the clip 16 from the sides. The rectangularity of the base portion 26 serves to align the deck boards during the deck assembly. The base portion 26 also has an outer surface that is planar throughout.

Figure 6:
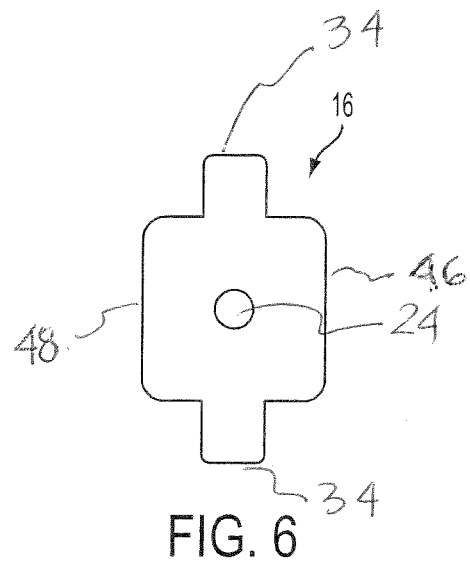
FIG. 6 illustrates a top view of the fastener assembly clip according to the embodiment of FIG. 1.

The crosspiece 28 of the clip 16 can be substantially a cross in shape, as shown in the top view of FIG. 6. In an embodiment, the crosspiece 28 includes, on the same plane, a pair of flanges 46, 48 that project over the base portion 26 and a pair of shoulders 34 at right angles to the flanges and coplanar with a perimeter P of the base. See, for example, FIG. 3. When the fastening member 22 is installed in the decking assembly, the flanges 46, 48 are positioned within grooves in the sides of the adjacent deck boards. The flanges 46, 48 have a height 32 that matches the grooves in the sides of the deck boards to ensure a secure fit.

As shown in FIG. 3, the outer edges of the flanges 46, 48 are curved. Also, as shown in FIGS. 3 and 4, the crosspiece 28 has a planar upper surface 30 and planar lower surfaces 36 that are formed by the flanges 46, 48. The planar upper 30 and lower 36 surfaces are perpendicular to the base 26. The outer surfaces 40 of the crosspiece flanges are parallel to the shank portion 18 of the fastener 12 and the outer surfaces of the base 26.

The crosspiece 28 is substantially uniform about the longitudinal axis A, thereby forming a substantially symmetrical clip.

The clip 16 can be of any material including metal or plastic or a combination of metal and plastic. In an embodiment, the clip can be injection molded plastic. The clip can be formed such that it has rigidity. In an embodiment, the entire body of the clip is a rigid plastic.

FIG. 2 illustrates an expanded fastener assembly 10 in which the fasteners 12 are connected to each other with the collation member 14 applied to the parallely arranged fasteners 12 at their respective shanks 18. The clips 16 are disposed around a lower portion of the fastener 12 above the tip portion 20.

The fastener assembly 10 includes a plurality of fastening members 22 arranged adjacent to each other. The fastening members 22 include the nail or fastener 12 interference fit into the clip 16.

Adjacent fasteners are attached to each other by the collation member 14. The collation member 14 is attached to the shank portions 18 of the fasteners 12, between the fastener head portions 11 and fastener tip portions 20. The collation member 14 can be formed from paper having an adhesive, such as glue, on a side facing the fastener 12. In an embodiment, the collation member 14 is in the form a strip that extends from the forwardmost fastener to the last fastener in the fastener assembly 10. While, the fasteners 12 are spaced apart from each other, the collation member 14 serves to connect the fasteners 12 for the fastening members together. However, the clips 16 of the fastening members 22 are not connected. Namely, the clips 16 are separated from each other by a gap and are non-contacting.

In an embodiment a plurality of fastening members 22 form the fastener assembly 10. The plurality of fastening members 22 include a forward fastening member, which is at the front of the fastener assembly, and would be fed to the nosepiece of the fastening tool before a next or rear fastening member. The forward fastening member has a forward face 42 on the nosepiece side of the magazine and a rear face 44 radially opposing the forward face, on the pusher side of the magazine. The rear face 44 of the forward fastening member faces a forward face 42 of the next or rear fastening member.

In the fastener assembly 10, the forward face of the clip 16 includes a forward flange 46. The rear face of the clip 16 includes a rear flange 48. The rear flange 48 is disposed on a radially opposing side of the aperture from the forward flange 46. The upper surface of the forward flange 46 and the upper surface of the rear flange 48 form the upper surface 30 of the clip 16.

The rear flange 48 of the clip 16 in the forward fastening member is spaced apart, by a gap 50. The gap 50 is defined between the base portion 26 on the forward face 42 of the clip 16 in the rear fastening member and the rear flange 48 on the rear face 44 of the forward fastening member. In order to ensure a dense array of fastening members, it is preferred to provide the maximum number of nails in the least amount of space. Accordingly, the gap 50 is designed to be as small as possible.

In an embodiment, the forward flange 46 of the rear fastening member is positioned vertically between the collation member 14 and the rear flange 48 of the forward fastening member. The forward flange 46 of the rear fastening member partially and non-contactingly, overlaps the rear flange 48 of the forward fastening member in a horizontal direction.

In an embodiment, the rear flange 48 of the fastening member has a greater length than the forward flange 46. The size differential accommodates the head portion 11 of the fastener 12, so that the head portion of each forward fastening member can effectively clear the forward flange 46 of the rear fastening member when the fastening member 22 is struck by the driver blade.

The distance between the forward flange 46 of the rear fastening member and the shank portion 18 of the forward fastening member can be greater than the distance between the base portion 26 of the rear fastening member and the rear flange 48 of the forward fastening member. Alternatively, distance between the forward flange 46 of the rear fastening member and the shank portion 18 of the forward fastening member can be equal to the distance between the base portion 26 of the rear fastening member and the rear flange of the forward fastening member.

In an embodiment, the shank portion 18 of the forward fastening member is positioned parallel and adjacent to the shank portion 18 of the rear fastening member and connected by the collation member 14. The clip 16 of the forward fastening member being spaced apart from the clip 16 of the rear fastening member.

As an example, the fastening tool includes a magazine connected to a tool housing and a nosepiece. The nosepiece is mounted to the housing. The magazine is coupled to the nosepiece at one end thereof and is mounted to the tool handle at an opposite end thereof.

In operation, the fastener assembly is loaded into the fastening tool through a fastener loading assembly, often identified as the fastening tool magazine. The fastening tool magazine provides storage capabilities for the fastener assembly 10 as well as the ability to present the fastening members 22 to a fastening member driving assembly. The fastening member driving assembly of a pneumatic or electrically powered fastening tool uses air pressure or a solenoid, respectively, to drive a driver blade through a channel disposed within the nosepiece. The nosepiece is coupled with the fastening tool magazine and is where an individual fastening member 22 is presented.

The inside of the fastening tool magazine typically includes a mechanism for providing a pushing force to the fastening members. The pushing force pushes the fastening member 22 down the length of the fastening tool magazine to the nosepiece. The pushing force keeps a constant pressure on the fastening members 22 so that as one fastening member is driven by the driver blade the next fastening member is forced into the nosepiece to replace it.

When the fastening tool drives the fastening member from the tool and into the joist, the shank portion 18 of the fastener 12 slides through the aperture 24 of clip 16. As the head portion 11 of the fastener 12 is larger in diameter than the aperture 24, the fastener comes to a stop when the head portion reaches the upper surface 30 of the clip 16. Manufactured deck boards have pre-machined grooves on laterally adjacent sides into which the flanges 46, 48, having a predetermined thickness 32, are inserted.

Once installed between the adjacent boards and installed in the joist, the fastening member 22 is hidden from view.

While aspects of the present invention are described herein and illustrated in the accompanying drawings in the context of a pneumatic fastening tool, those of ordinary skill in the art will appreciate that the invention, in its broadest aspects, has further applicability.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description.

We claim:

1. A fastening member in a fastener assembly for use in securing adjacent deck boards to an underlying joist, the fastening member comprising:
   a first component having an elongated body, a head portion at one end of the elongated body, a tip portion at an opposite end and a shank portion therebetween;
   a second component mounted adjacent to the tip portion of the first component, the second component having an aperture defining a longitudinal axis for receiving the first component in an interference fit,
   wherein the longitudinal axis of the first component is coaxial with the longitudinal axis of the second component,
   wherein the second component is a unitary member comprising a base portion and a crosspiece extending perpendicularly to the base portion, the aperture passing through the base portion and the crosspiece, and
   wherein the crosspiece comprises, on the same plane, a pair of flanges projecting over the base portion and a pair of shoulders at right angles to the flanges and coplanar with a perimeter of the base.

2. The fastening member according to claim 1, wherein the head portion of the first component is larger than the diameter of the aperture in the second component.

3. The fastening member according to claim 1, wherein the second component has a substantially T-shaped cross-section.

4. The fastening member according to claim 1, wherein the crosspiece is substantially a cross in shape.

5. The fastening member according to claim 1, wherein the crosspiece is substantially uniform about the longitudinal axis.

6. The fastening member according to claim 1, wherein the aperture has a uniform diameter throughout its length.

7. The fastening member according to claim 1, wherein the first component is a nail.

8. The fastening member according to claim 1, wherein the second component is a rigid clip.

9. The fastening member according to claim 1, wherein the second component is formed from plastic.

10. A fastener assembly comprising:
    a plurality of fastening members arranged adjacent to each other, the plurality of fastening members having:
       first components arranged adjacent to each other, each first component including a head portion at one end, a tip portion at an opposite end and a shank portion therebetween; and
       second components mounted around tip portions of the first components, each second component having an aperture defining a longitudinal axis for receiving each first component in an interference fit; and
    a collation member attached across the shank portions of the first components to collate the first components together,
    wherein adjacent second components are non-contacting, and
    wherein the longitudinal axis of each first component is coaxial with the longitudinal axis of each second component,
    wherein the plurality of fastening members comprise a forward fastening member and at least one rear fastening member, the forward fastening member and the at least one rear fastening member each having a forward face and a rear face radially opposing the forward face, the rear face of the forward fastening member facing a forward face of the at least one rear fastening member, wherein the second component comprises a base portion having a forward flange projecting in a direction of the forward face of the fastening member and a rear flange projecting in a direction of the rear face of the fastening member on a radially opposing side of the aperture, and wherein the rear flange of the forward fastening member is spaced apart from the forward flange of the at least one rear fastening member in a vertical direction.

11. The fastener assembly according to claim 10, wherein a distance between the forward flange of the at least one rear fastening member and the shank of the forward fastening member is greater than a distance between the base portion of the at least one rear fastening member and the rear flange of the forward fastening member.

12. The fastener assembly according to claim 10, wherein a distance between the forward flange of the at least one rear fastening member and the shank of the forward fastening member is equal to a distance between the base portion of the at least one rear fastening member and the rear flange of the forward fastening member.

13. The fastener assembly according to claim 10, wherein the first components are spaced apart from each other at a distance greater than the length of one of the forward flange and the rear flange.

14. A fastener assembly comprising:
a plurality of fastening members arranged adjacent to each other, the plurality of fastening members having:
  first components arranged adjacent to each other, each first component including a head portion at one end, a tip portion at an opposite end and a shank portion therebetween; and
  second components mounted around tip portions of the first components, each second component having an aperture defining a longitudinal axis for receiving each first component in an interference fit; and
  a collation member attached across the shank portions of the first components to collate the first components together,
wherein adjacent second components are non-contacting,
wherein the longitudinal axis of each first component is coaxial with the longitudinal axis of each second component,
wherein the plurality of fastening members comprise a forward fastening member and at least one rear fastening member, the forward fastening member and the at least one rear fastening member each having a forward face and a rear face radially opposing the forward face, the rear face of the forward fastening member facing a forward face of the at least one rear fastening member,
wherein the second component comprises a base portion having a forward flange projecting in a direction of the forward face of the fastening member and a rear flange projecting in a direction of the rear face of the fastening member on a radially opposing side of the aperture, and
wherein the forward flange of the at least one rear fastening member partially overlaps the rear flange of the forward fastening member in a horizontal direction.

15. A fastener assembly comprising:
a plurality of fastening members arranged adjacent to each other, the plurality of fastening members having:
  first components arranged adjacent to each other, each first component including a head portion at one end, a tip portion at an opposite end and a shank portion therebetween; and
  second components mounted around tip portions of the first components, each second component having an aperture defining a longitudinal axis for receiving each first component in an interference fit; and
  a collation member attached across the shank portions of the first components to collate the first components together,
wherein adjacent second components are non-contacting,
wherein the longitudinal axis of each first component is coaxial with the longitudinal axis of each second component,
wherein the plurality of fastening members comprise a forward fastening member and at least one rear fastening member, the forward fastening member and the at least one rear fastening member each having a forward face and a rear face radially opposing the forward face, the rear face of the forward fastening member facing a forward face of the at least one rear fastening member,
wherein the second component comprises a base portion having a forward flange projecting in a direction of the forward face of the fastening member and a rear flange projecting in a direction of the rear face of the fastening member on a radially opposing side of the aperture, and
wherein the rear flange of each fastening member has a greater length than the forward flange.

* * * * *